United States Patent
Elmachtoub et al.

(10) Patent No.: US 10,546,320 B2
(45) Date of Patent: Jan. 28, 2020

(54) DETERMINING FEATURE IMPORTANCE AND TARGET POPULATION IN THE CONTEXT OF PROMOTION RECOMMENDATION

(71) Applicant: International Business Machines Corporation, Armonk, NY (US)

(72) Inventors: Adam N. Elmachtoub, New York, NY (US); Markus Ettl, Ossining, NY (US); Sechan Oh, Stanford, CT (US); Marek Petrik, Croton on Hudson, NY (US); Rajesh K. Ravi, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 14/826,819

(22) Filed: Aug. 14, 2015

(65) Prior Publication Data
US 2017/0046736 A1     Feb. 16, 2017

(51) Int. Cl.
G06Q 30/02       (2012.01)
G06Q 10/06       (2012.01)

(52) U.S. Cl.
CPC ....... G06Q 30/0255 (2013.01); G06Q 10/067 (2013.01)

(58) Field of Classification Search
USPC ....................................................... 705/319
See application file for complete search history.

(56) References Cited

U.S. PATENT DOCUMENTS

| | | | |
|---|---|---|---|
| 7,561,158 B2 | 7/2009 | Abe et al. | |
| 7,644,094 B2 | 1/2010 | Heckerman | |
| 2002/0159642 A1 | 10/2002 | Whitney | |
| 2005/0159996 A1* | 7/2005 | Lazarus | G06Q 30/02 705/7.31 |
| 2010/0262556 A1 | 10/2010 | Shaya et al. | |

(Continued)

OTHER PUBLICATIONS

"Optimizing E-tailer Profits and Customer Savings: Pricing Multi-stage Customized Online Bundles", Yuanchun Jiang, Jennifer Shang, Chris F. Kemerer, Yezheng Liu; Feb. 9, 2011 (Year: 2011).*

(Continued)

*Primary Examiner* — Gautam Ubale
(74) *Attorney, Agent, or Firm* — Scully, Scott, Murphy & Presser, PC; Daniel P. Morris, Esq.

(57) ABSTRACT

A system, method and computer program product for determining a target population to be subject to a promotion or offer of goods/services. The target population is determined that strongly prefers a given promotion, while also making sure the target population represents a sizable number of consumers such that profits may be maximized. The system provides an output solution listing available promotion options and one or more corresponding target groups based on solving an optimization problem that incorporates, prior obtained most important customer features for each promotion using historical promotion data and statistics measures. The system may automatically initiate a promotion offering to each of said customers by communicating the promotion to the members of the targeted group of people, wherein a percentage of future transactions to which the promotion is offered is expected to exceed a threshold level.

15 Claims, 7 Drawing Sheets

(56) References Cited

U.S. PATENT DOCUMENTS

| | | | |
|---|---|---|---|
| 2012/0101886 A1* | 4/2012 | Subramanian | G06Q 30/0222 705/14.23 |
| 2013/0144715 A1* | 6/2013 | Kranzley | G06O 30/0251 705/14.49 |
| 2014/0207791 A1 | 7/2014 | Danilevsky et al. | |
| 2014/0297363 A1* | 10/2014 | Vemana | G06Q 30/0201 705/7.29 |
| 2015/0006295 A1 | 1/2015 | Liu et al. | |
| 2015/0178637 A1 | 6/2015 | Bogojeska et al. | |
| 2015/0348083 A1* | 12/2015 | Brill | G06Q 30/0222 705/14.23 |

OTHER PUBLICATIONS

"Hybrid least-squares algorithms for approximate policy evaluation", Jeff Johns, Marek Petrik, Sridhar Mahadevan, Jul. 23, 2009 (Year: 2009).*

"Managing product availability in an assemble-to-order supply chain with multiple customer segments", Thomas R. Ervolina, Markus Ettl, Young M. Lee, Daniel J. Peters, Nov. 28, 2007 (Year: 2007).*

Tan et al., "The Impact of Feature Selection: A Data-Mining Application in Direct Marketing", Intelligent Systems in Accounting, Finance and Management, Intell. Sys. Acc. Fin. Mgmt. 20, 23-38 (2013) Published online: Mar. 5, 2013 in Wiley Online Library (wileyonlinelibrary.com) DOI: 10.1002/isaf/1335.

* cited by examiner

| TRANSACTION ID 52 | TRANSACTION DATE 55 | TIER LEVEL 58 | AGE 60 | YEARS ON MEMBERSHIP PROGRAM 62 | TOTAL # OF FLIGHTS IN LAST 2 YEARS 64 | MILE BALANCE 66 | OFFERED PROMOTION 70 | ACCEPTANCE 75 |
|---|---|---|---|---|---|---|---|---|
| 1 | 5/12/2014 | GOLD | 42 | 5 | 35 | 145,000 | UPGRADE  72 | Y |
| 2 | 5/13/2014 | BLUE | 30 | 0.2 | 0 | 0 | NO PROMOTION  73 | N |
| 3 | 5/13/2014 | BLUE | 22 | 2 | 2 | 22,000 | BONUS MILE | N |

FIG. 3

DETERMINING FEATURE IMPORTANCE AND TARGET POPULATION IN THE CONTEXT OF PROMOTION RECOMMENDATION

FIELD

The present disclosure generally relates to marketing systems and methods, and particularly, computer-implemented techniques for determining importance of features that can be used to determine particular promotions for customers that maximizes utility and profit.

BACKGROUND

In relation to an entity, e.g., a business enterprise or a firm, that wants to maximize revenue by providing promotions to its customers, that entity must first decide on which promotion to provide to which customer, and additionally needs to predict the probabilities that the customer accepts each promotion.

However, feature importance in the context of prediction is not necessarily appropriate.

That is, for example, supposing a certain customer "feature" such as customer's age has a strong influence to the likelihood of acceptance for all promotion options including no promotion option: this "feature" is important in predicting customers' acceptance decisions. However, this feature may not be important in determining which promotion to provide if the responses to each promotion is influenced uniformly.

Thus, while literature exists on feature importance (or feature selection) as concerning a feature's influence to the likelihood of acceptance for all promotion options including no promotion, there is no concern for defining importance of features in the context of recommending promotions to maximize a profit.

Thus, it is a challenge how to effectively identify features and their importance in determining not only to which customers promotions (e.g., of products or services) are to be targeted, but to generally identify the key features that are useful to make optimal promotion recommendations to a target population, and automatically provide valuation business insights.

BRIEF SUMMARY

A system and method that leverages historical and profile information and other techniques to identify the key features that are useful to make optimal promotion recommendations, e.g., by narrowing the scope of big data collection to a few key features; and given these features, identify a target population for each promotion.

This target population is the ideal type/group of customers that strongly prefers this promotion over other promotions. A marketing campaign may then be tailored such that an entity can proactively promote these promotions to the target population identified.

Thus, in one aspect, there is provided a computer-implemented method for generating targeted promotions. The method comprises: receiving at a processing unit, historical promotion data offered to plurality of customers, and receiving, at the processing unit, features of customers associated with prior transactions associated with previous promotion offerings and acceptances as recorded in a memory storage device; measuring, at the processing unit, an importance of customer features using the received customer features data and historical promotion data; and using said measured importance of customer features to determine target groups for promotion recommendation by solving, at the processing unit, an optimization problem to maximize a difference between a target group's expected acceptance rate for a given promotion and the target group's highest expected acceptance rate for any promotion excluding the given promotion, and a constraint that the probability that the percentage of customers who will receive target group promotion meets a given threshold.

In a further aspect, there is provided a system for generating targeted promotions. The system comprises: a computer having a memory storage unit storing a program of instructions; a hardware processor device communicatively coupled with the memory storage unit and receiving the program of instructions to configure the processor device to: receive historical promotion data offered to plurality of customers; receive features of customers associated with prior transactions associated with previous promotion offerings and acceptances as recorded in a memory storage device; measure an importance of customer features using the received customer features data and historical promotion data; and use said measured importance of customer features to determine target groups for promotion recommendation by solving an optimization problem to maximize the difference between a target group's expected acceptance rate for a given promotion and the target group's highest expected acceptance rate for any promotion excluding the given promotion, and a constraint that the probability that the percentage of customers who will receive target group promotion meets a given threshold.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

Other aspects, features and advantages of the present invention will become more fully apparent from the following detailed description, the appended claims, and the accompanying drawings in which similar elements are given similar reference numerals.

FIG. 3 is an example of several data base records 50 of past historical promotion transaction data and customer features data obtained from memory in one example implementation;

DETAILED DESCRIPTION

The present disclosure relates to systems and methods for identifying groups of people for offering targeted promotions of products, including e.g., goods and/or services, based on past historical promotion and transaction data of customers. Use of customer features of those customers associated with the past historical promotion offer, acceptance and other transaction feature data of customers, e.g., typically stored in databases legacy systems, is used for purposes of identifying a population of target entities (e.g., customers) for more direct targeted promotion of offers for goods, services, or both goods and services, in a manner designed to maximize the offering entity's profits.

An approach is taken that defines a target group in promotion/product recommendation include a model driven approach that characterizes customer features that yield the highest acceptance probability for each promotion. This approach can produce a target group, which may not even come to the system often (i.e., a sparse group).

The approach described herein implements a system and method to find a target population that strongly prefers a given promotion, while also making sure the target population represents a sizable number of consumers.

Figure 1:
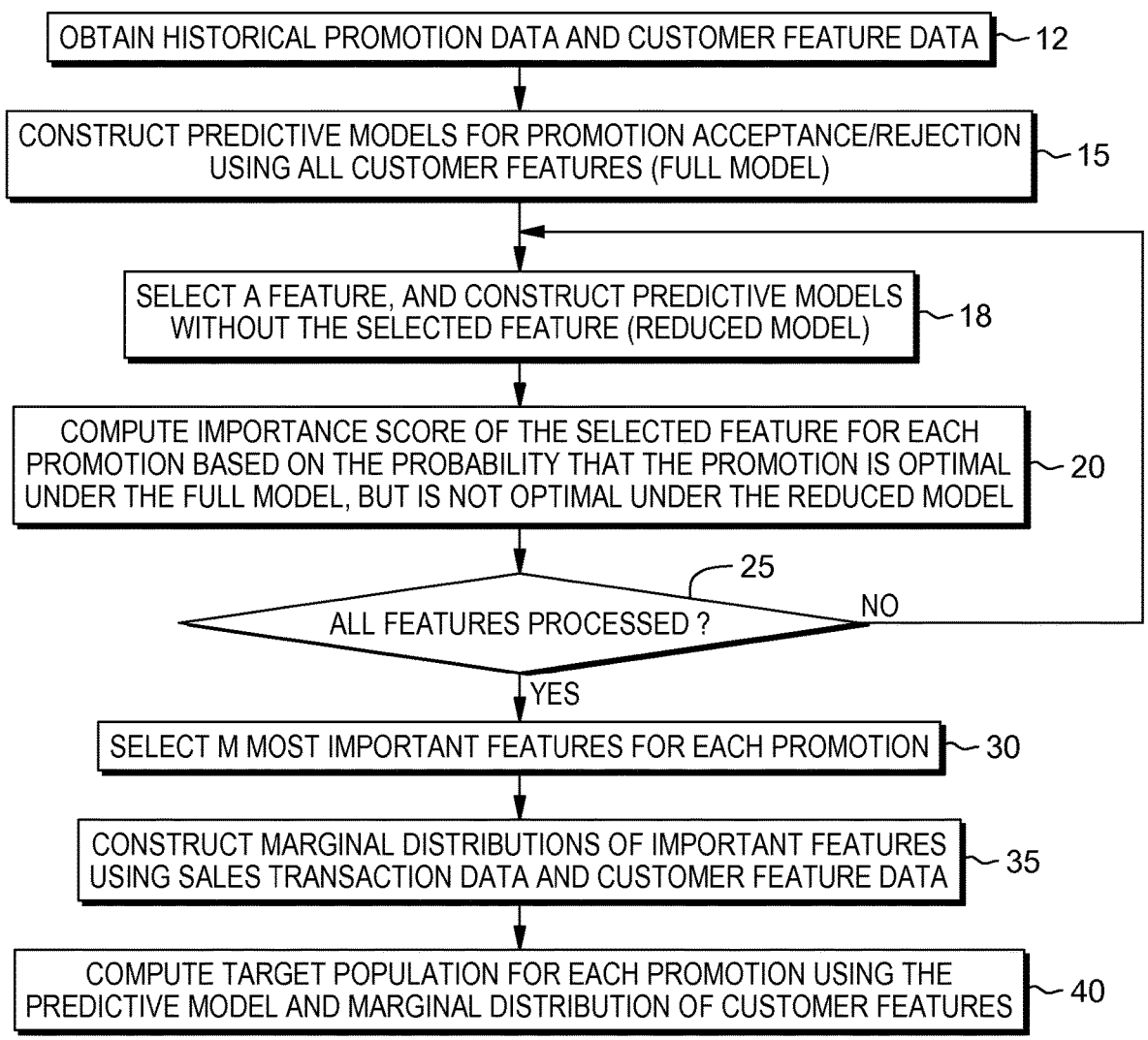
FIG. 1 depicts a computer-implemented method 10 that determines which features that are important in determining which promotion to provide and to which customers according to one embodiment.

In one example implementation, there is considered an entity or firm that wants to maximize revenue by providing promotions to its customers. To decide on which promotion to provide to a certain customer, a method such as described in FIG. 1 is implemented. In the method feature importance is defined in the context of recommending promotions to maximize profit.

FIG. 1 depicts a computer-implemented method 10 that determines which features that are important in determining which promotion to provide and to which customers.

In the method 10, at a first step 12, the computer system receives or accesses data from storage in a memory storage device that includes historical promotion data and customer feature data. Example historical data refers to the stored data records on promotions offered in the past (e.g., a type of promotion offered), and a snapshot of the features of the customer ("customer features") who were offered the promotion, and the customer's response (i.e., whether the customer accepted or rejected the promotion). Customer feature data refers to those attributes of customers that could benefit from a particular promotion. For example, in the context of targeting airline promotions, e.g., promoting a discount on air travel, examples of customer features used in defining groups or individuals may include: a customer's membership in a loyalty program and a particular tier level in a loyalty program membership, a number of flights a customer took in the past 2 years, an amount of time on a membership program, an age of the customer, a sky mileage balance, etc.

Then, in FIG. 1, for the method at 15, the computer system uses the customer feature data and historical promotion data received from the memory storage device to construct a predictive model(s) for promotion acceptance/rejection using all customer features. The initial constructed predictive model for promotion using all of the customer features is referred to as the "full model". In one non-limiting environment, a predictive model(s) can be constructed via various statistical and machine learning methods such as logistic regression model, naive Bayesian modeling, and neural network modeling techniques, as known in the art. For example, for a given promotion s, a logistic regression method is used to estimate the parameters $\beta_s$ of a logit function $$\frac{1}{1+\exp(-\beta_s x)},$$

where x is the vector of customer features, and the logit function indicates the probability that a customer with features x will accept promotion s.

Then, in a step 18, the computer system selects a feature, and constructs a predictive model without the selected feature to result in a "reduced model". For example, for a given promotion s and a selected customer feature n, logistic regression method estimates the parameters $\beta_s^{-n}$ of a logit function $$\frac{1}{1+\exp(-\beta_s^{-n} x^{-n})},$$

where $x^{-n}$ is the customer feature vector x excluding feature n. Thus, a difference between the "full" model and "reduced" model is whether to include all available customer features or exclude a certain feature in predictive modeling.

Continuing to step 20, FIG. 1, the computer system is configured to compute an importance score of the selected feature for each promotion based on the probability that the promotion is optimal under the full model, but is not optimal under the reduced model.

Continuing to step 25, a decision is made as to whether all features have been processed, i.e., whether a "reduced" predictive model and importance score of the selected feature for a promotion has been computed for each feature. If all of the features have not been processed, the method iterates back to step 18 where the next feature is selected and a predictive model constructed without the selected feature to produce a corresponding reduced model. Then the process again continues to step 20 to compute an importance score of the selected feature for that promotion and returns to step 25. The iterations between steps 18, 20 and 25 ensure that all features have been processed and importance scores generated for each of the features selected.

It is understood that the iterative steps 18-25 in computing an importance score of selected features is performed for all promotions including no promotion option.

Having processed all of the features with respect to each promotion, the process of FIG. 1 proceeds to step 30 where the computing system selects from the computed importance scores the most important "M" features for each promotion.

Then, at 35, the computing system constructs marginal distributions of important features using sales transaction data and customer feature data.

Finally, at step 40, FIG. 1, the computing system computes a target population for each promotion using the predictive model and marginal distribution of customer features.

Figure 2A:
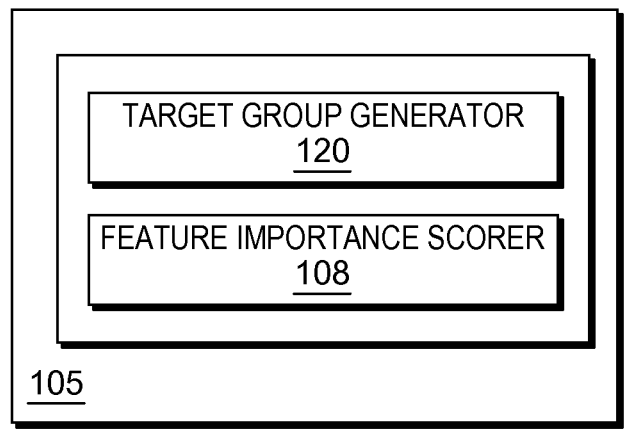
FIG. 2A depicts various processing modules and components stored at various locations in a memory storage 105 of a computing system 100 that each include instructions run by a processor unit.
Figure 2B:
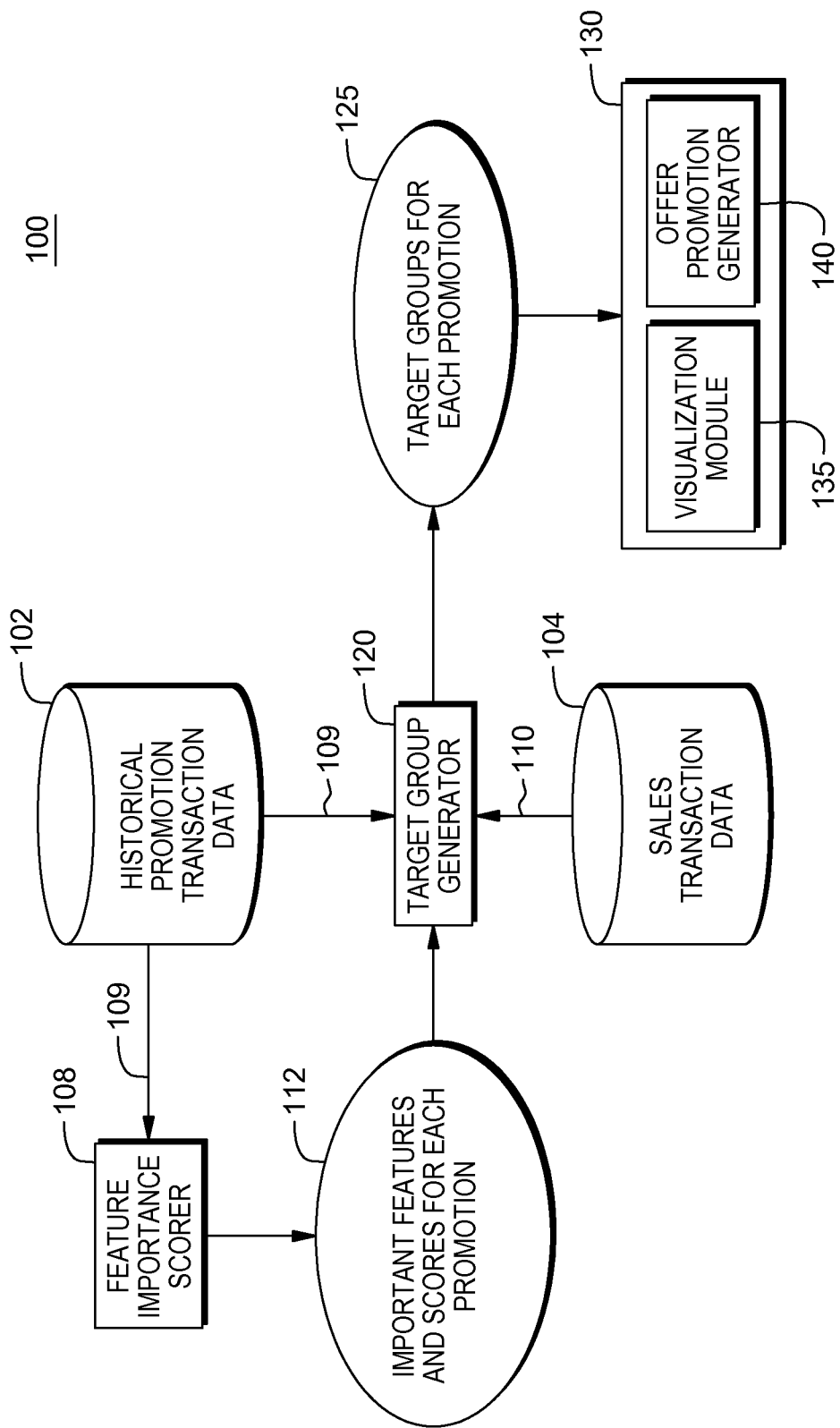
FIG. 2B shows a diagram of the major system components of the computing system 100 for effective feature importance scoring and target group promoting.

FIGS. 2A and 2B show diagrams depicting the major system components of a computing system 100 for effective feature importance scoring and target group promoting. Each component includes programmed instructions that execute on the stored system or historical data, e.g., "legacy" data, such as stored in a memory storage device and/or one or more databases. For instance, as shown in FIG. 2B, a database 102 may be accessed that stores an entity's historical promotion transaction data. A further database 104 stores the entity's historical/current sales transaction data used in a process for determining a target group for a particular promotion. In one embodiment, computer system 100 includes a receiving element configured to receive or access the historical promotion and transaction data from the database 102 and the historical sales transaction data from the database 104.

FIG. 2A particularly depicts various processing modules and components stored at various locations in a memory storage 105 of a computing system 100 that each include instructions run by a processor unit. In one embodiment, stored at various locations in a memory storage device 105 of computing system 100 include a Feature Importance Scorer software component 108 running programmed instructions governing the system to compute an importance score of each customer feature with respect to a certain promotion. System 100 further includes a Target Group Generator component 120 running programmed instructions governing the system to identify, for each promotion, a target group of customers.

Although not shown, each of these programmed instructions may operate on by different computing elements or distributed machines, each operatively connected together via a system bus (not shown). In one example, communication between and among the various system components may be bi-directional. In another example, communication amongst the elements may be carried out via network (e.g., the Internet, an intranet, a local area network, a wide area network and/or any other desired communication channel(s)). In another example, some or all of these elements may be implemented in a computer system of the type shown in FIG. 7.

Returning to FIG. 2B, in one embodiment, using the entity's historical promotion transaction data and customer feature data 109 stored in database 102, the feature importance scorer software component 108 is run by a processor unit in the computer system 100 to generate at 112 the important features and corresponding computed importance scores thereof for each promotion. In this regard, the computer system is configured to perform feature importance scoring for each customer feature with respect to a certain promotion.

Referring to FIG. 3 as a non-limiting example, there is shown several data base records 50 of past historical promotion data and customer features data 109 related to transactions as stored in and received from a database 102. In a non-limiting air line travel promotion example, each record of historical promotion transaction data may include a transaction identifier transaction ID 52 and a date of the transaction 55. However, the record includes further information relating to features of the customer (customer features) who was offered the promotion including, but not limited to: a tier level 58 if the customer is a member of a loyalty or rewards program, the customer's age 60, a number of years 62 that customer has been a member of the loyalty or rewards program, a total number of flights 64 a customer took in the past 2 years, a reward mileage balance 66, whether the customer was offered a promotion at 70 and the type of promotion that was offered 72 (e.g., airline passenger seat upgrade), or whether no promotion was offered 73, and a response whether that customer had accepted or rejected the promotion offer at 75. Those customer features shown as features 65 of a data record 50 show the respective values at the time of promotion offering (and thus constitute a snapshot, not the present values of the customer).

In one embodiment, the feature importance scorer software component 108 of computing system 100 is configured to define several data parameters including: a number of transactions represented as T; a number of customer features represented as N; and a set of promotion options represented as S. For given transaction ID i, the processor carrying out the methods of feature importance scorer is configured to let $x^i = (x^i_1, x^i_2, \ldots x^i_N)$ be the vector of customer features of transaction i. The computer system processing unit is further configured to denote the empirical probability distribution of customer features by $f(x)$ according to:

$$f(x) = \text{(number of transaction records whose customer feature is } x)/T.$$

Figure 4:
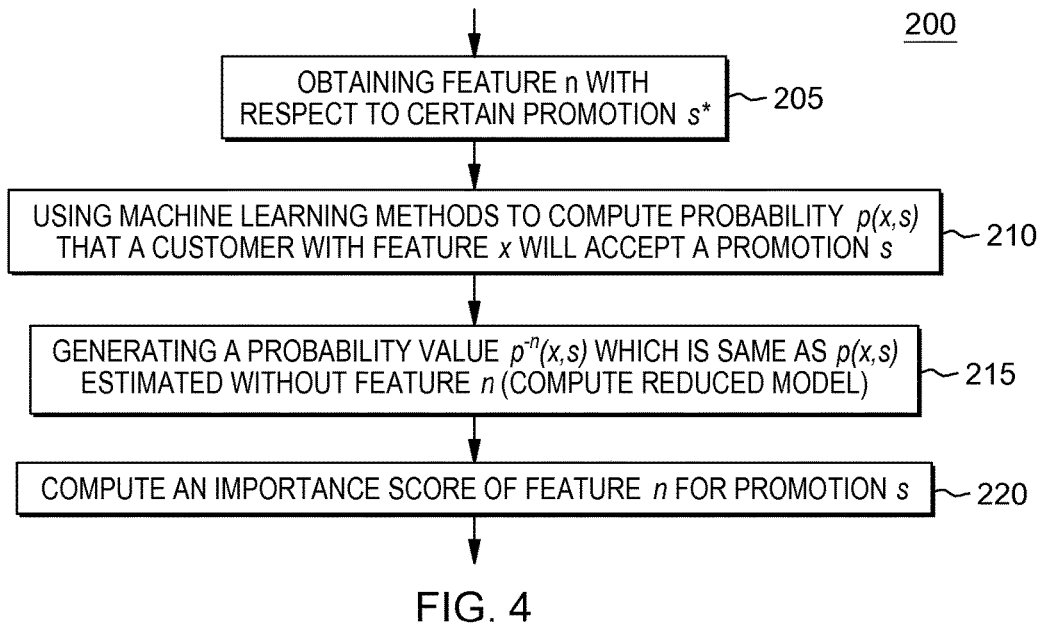
FIG. 4 depicts one embodiment of a method 200 run by the Feature Importance Scorer software component of the computing system for computing an importance score of each customer feature n respect to a certain promotion.

FIG. 4 depicts generally a method 200 run by the Feature Importance Scorer software component 108 of computing system 100 for computing an importance score of each customer feature n where $n \in \{1.2 \ldots N\}$ with respect to a certain promotion $s^* \in S$. In FIG. 4, after obtaining the particular feature n with respect to a certain promotion $s^*$ at 205, the Feature Importance Scorer software component 108 is configured at 210 to compute a probability $p(x,s)$ representing a probability that a customer with feature x will accept promotion s in which a full model (i.e., all customer features) for promotion "s" is provided. This probability function $p(x,s)$ can be estimated via standard statistical or machine learning methods using the historical promotion transaction data 109 and, e.g., using the logit function described above. Then, the method at 215 generates a probability value $p^{-n}(x,s)$ which is the same probability as $p(x,s)$ estimated without inclusion of feature n, e.g., using the logit function described above.

This step results in the generating of a reduced model for the promotion s without feature n. Then, at 220, the method computes an importance score of feature $n \in \{1.2 \ldots N\}$ for promotion $s^* \in S$. The importance score of feature n for promotion s is computed according to:

$$\int 1[s^* = \arg\max_s p(x,s)] 1[s^* \neq \arg\max_s p^{-n}(x,s)] f(x) dx$$

wherein $\arg\max_s p(x,s)$ indicates the promotion s that maximizes the probability function $p(x,s)$ for a given x and wherein $1["event" X] = 1$ if "event" X is true, and otherwise it is 0. That is, wherein $1[s^* = \arg\max_s p(x,s)] = 1$ if "$s^* = \arg\max_s p(x,s)$" is true, and otherwise $1[s^* = \arg\max_s p(x,s)] = 0$; and likewise, wherein $1[s^* \neq \arg\max_s p^{-n}(x,s)] = 1$ if "$s^* \neq \arg\max_s p^{-n}(x,s)$" is true, and otherwise $1[s^* \neq \arg\max_s p^{-n}(x,s)] = 0$. This score thus indicates the probability that the optimal promotion is $s^*$, but a different promotion is recommended when feature n is ignored.

Referring back to FIG. 2B, using the entity's historical promotion transaction data and customer feature data 109, sales transaction data 110, and the generated important features and corresponding computed importance scores thereof 112 for each promotion, the target group generator software component 120 that is run by a processor unit in the computer system 100 generates at 125 the target groups for each promotion.

Figure 5:
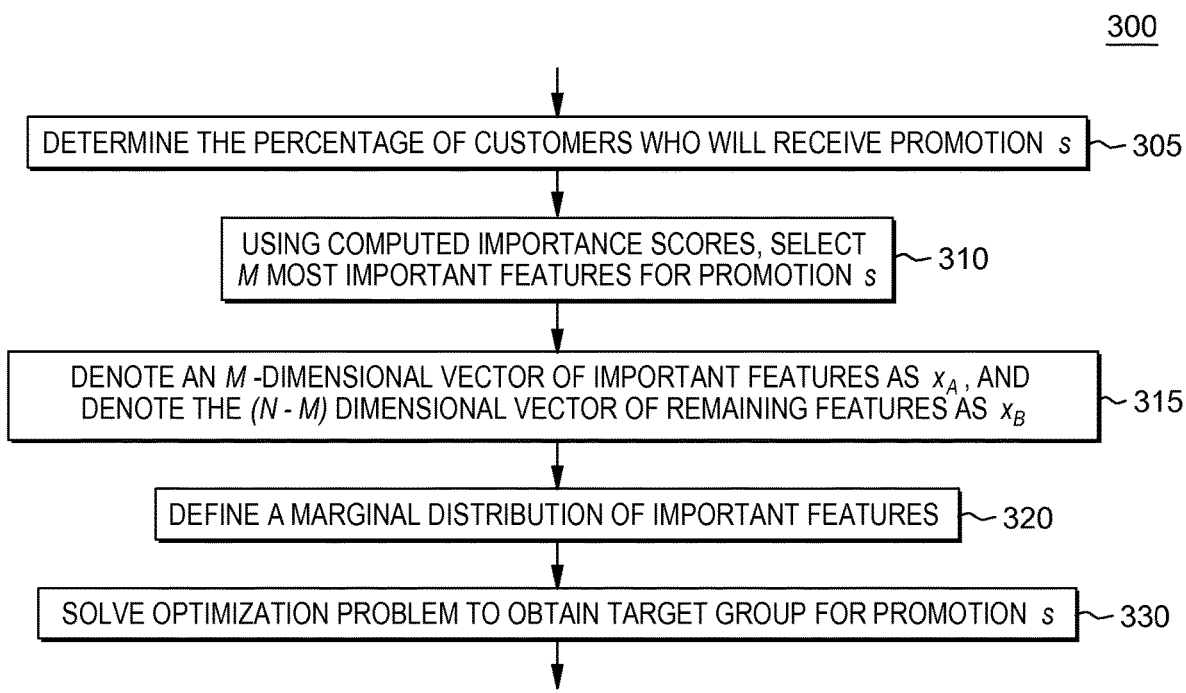
FIG. 5 depicts generally a method 300 run by the Target Group Generator software component 120 of computing system 100 for computing a group of customers for each promotion s.

FIG. 5 depicts generally a method 300 run by the Target Group Generator software component 120 of computing system 100 for computing a group of customers for each promotion s∈S. In FIG. 5, in one embodiment, after obtaining the particular promotion s, the processor at 305 receives from a user, via a computer screen interface, a value z(s) representing a percentage of future transactions out of all transactions for which promotion s will be provided. Then, at 310, based on the computed importance scores, the programmed processor selects the M most important features for promotion s. Then, at 315, for given feature vector x, an M-dimensional vector of important features is denoted as $x_A$, and the (N–M) dimensional vector of remaining features is denoted as $x_B$. Then, at 320, the processor device constructs a function representing the marginal distribution of important features $g(x_A)$ defined according to:

$$g(x_A) = \int_{x_B} f(x) dx_B$$

Then, at 330, as implemented by the hardware processing unit of computer system 100, the optimization problem is efficiently solved to optimality with contemporary optimization solvers or via numerical methods such as interior point methods, or heuristically via brute-force methods. The solution obtained include a target population of specific customer features for a promotion s*. First, the processor constructs an objective function according to an embodiment. The objective function is to maximize the difference between the target group's expected acceptance rate for a given promotion and the target group's highest expected acceptance rate for any promotion excluding the given promotion, and a constraint that the probability that the target group arrives in the system meets a given threshold. The constructed objective function is set forth as:

$$\max_{lb,ub} \int_x (p(x, s^*) - \max_{s \neq s^*} p(x, s)) 1[lb \leq x_A \leq ub] f(x) dx$$

such that a constraint $$\int_{lb \leq x_A \leq ub} g(x_A) dx_A = z(s)$$

is satisfied, where z(s) represents the percentage of future transactions to which promotion s will be provided, and lb and ub indicate the lower and upper bounds on the important features; and where $1[lb \leq x_A \leq ub]=1$ if "$lb \leq x_A \leq ub$ is satisfied, and otherwise $1[lb \leq x_A \leq ub]=0$. That is, lb and ub are the decision variables, and the solution of the optimization problems are the optimal lb and ub each of which is a vector of dimension M.

Figure 6:
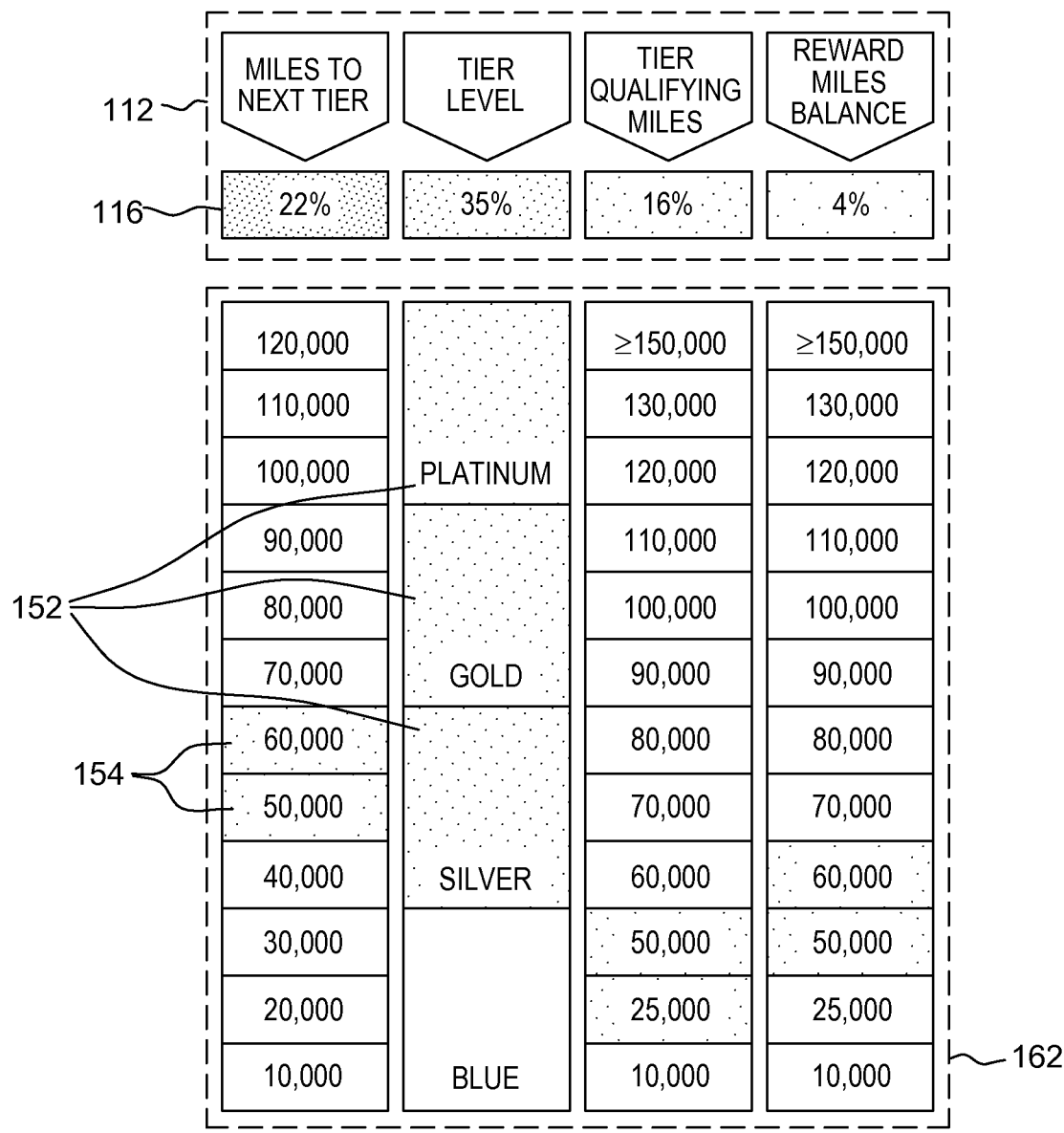
FIG. 6 depicts an embodiment of a computer screen interface 150 showing an example output generated by the solving of optimization problem that include use of the methods described herein.

For example, FIG. 6 visualizes the optimal lb and ub of a certain promotion. Here, the number of important features M is four (4), and the four most important features are (i) miles to next tier, (ii) a tier level, (iii) a tier qualifying miles, and (iv) a reward miles balance. The optimal lower bounds lb of the four important features are given as (50000, Silver, 25000, 50000) respectively, and the optimal upper bounds ub of the four features are given as (70000, Platinum, 60000, 70000) respectively.

In the preferred embodiment, solving optimization problem using a computer-implemented optimization solver yields the target groups for each promotion s*. The generated target groups and corresponding most important features listing are then output for display at a user device, e.g., computer system 400 of FIG. 7.

Referring back to FIG. 2B, an output module 130 of an embodiment displays promotions and their target groups indicated according to the mathematical optimization problem in view of the objective function, and the constraint set by the target group generator. Via a visualization module 135 presenting a results output display, a user may navigate through hundreds of promotions and analyze the effects of customer features forming the importance scores used in determining the target groups and that allows to identify the key features that are useful to make optimal promotion recommendations. The system implementing the methods described herein allows to narrow the scope of a "big data" collection to a few key features in which users may view the output of the analytics.

Given these features, the computer-implemented method identifies a target population for each promotion. This target population is the ideal type/group of customers that strongly prefers this promotion over other promotions. Then the method proactively promotes these promotion(s) to the target population the system has identified. For instance, using a module 140, a promotion offer may be automatically generated and sent, e.g., over a communications network (not shown), to customer(s) making up the target group, e.g., when a customer submits a price query on online sales channel or mobile sales channel, or via an e-mail, snail-mail messaging, text messaging, or through social network websites.

FIG. 6 depicts a computer screen interface 150 generated by visualization module 135 and depicting an example output results generated by the solving of optimization problem that include using the methods 10, 200 and 300 described herein with respect to FIGS. 1, 4 and 5 respectively. This screen interface 150 includes one or more example offers or promotions 160 for a particular user. For example, in the context of airlines travel promotions, a member may be a "skywards" member, i.e., a club of frequent airlines travelers. In the example output interface 150, an example offer or promotion 160 representing an offer to "upgrade an airplane seat to business class at a 10% discount," There is further indicated corresponding importance scores 112 of the top most important features that were generated by the method 200 of FIG. 4 herein for each particular promotion. For example, for promotion offer 160, there is indicated an example importance score 116 of 22% generated based on an example customer feature "Miles to Next Tier"; an importance score 35% was generated based on a customer feature "Tier Level"; an importance score 16% was generated based on a customer feature "Tier Qualifying Miles"; an importance score 4% was generated based on a customer feature "Reward Miles Balance". Each of these scores 112 indicates the probability that the optimal promotion is s*, but a different promotion is recommended when this feature is ignored.

For the example offer or promotion 160 shown via the screen interface 150, there is further shown the target groups 162 that will benefit from a specific promotion (or no promotion) based on the computed most important features, in a manner that maximizes likelihood that the members of the target group will accept the promotion given past historical and transactional data.

In one embodiment, visualization module 135 presenting a results output display via display interface 150 of FIG. 6, providing indicators in the form of darkened areas that visually indicate to the user which target group and which corresponding customer feature(s), would most benefit from and likely accept the promotion offer.

As shown in the output display of FIG. 6, for each example promotion and for each of the top-most (important) customer features, there is shown in differentiated darker background or highlight, a target group of customers. Thus for the example promotion "Upgrade to business class at 110% Discount" at 160 solving of the optimization problem generates output of targeted groups that meet the threshold lower limit of coming into the system for consideration of this offer 160. In one embodiment, a target group(s) may include groups 152 of customers that achieve silver, gold or platinum tier level status for the customer feature "Tier Level" deemed as important for this promotion. Alternately, or in addition, in one embodiment, the target group(s) may include groups 154 of customers that are only in the range of about 50,000 to 60,000 miles to the next tier level for the customer feature "Miles to Next Tier" deemed as important for this promotion 160*a*. As a further output example, in consideration of promotion 160*b* entitled "25% Bonus Skywards Miles", in one embodiment, a target group(s) may include a group 172 of customers that has only achieved a "silver tier" level status for the customer feature "Tier Level" deemed as important for this promotion. Alternately, or in addition, in one embodiment, the target group(s) may include groups 174 of customers that are only in the range of about 30,000 to 40,000 miles to the next tier level for the customer feature "Miles to Next Tier" deemed as important for this promotion 160*b*. It is understood that the target group includes customer having all of these features that meet the criteria.

In a further embodiment, the Offer promotion generator module 140 of FIG. 2B of the computer system 100 may implement the programmed processing unit to automatically select one or more target groups from among one or more of the available promotion options and related most important customer features output. In one embodiment, the module 140 implements the processor to automatically initiate a promotion offering to each of the customers of the targeted group of people to be targeted for a particular promotion s*, wherein the percentage of future transactions to which promotion s* is offered is expected to exceed a threshold level. Thus, the processor is further configured to initiate a marketing campaign tailored such that an entity can automatically or proactively promote these promotions to the target population identified.

Figure 7:
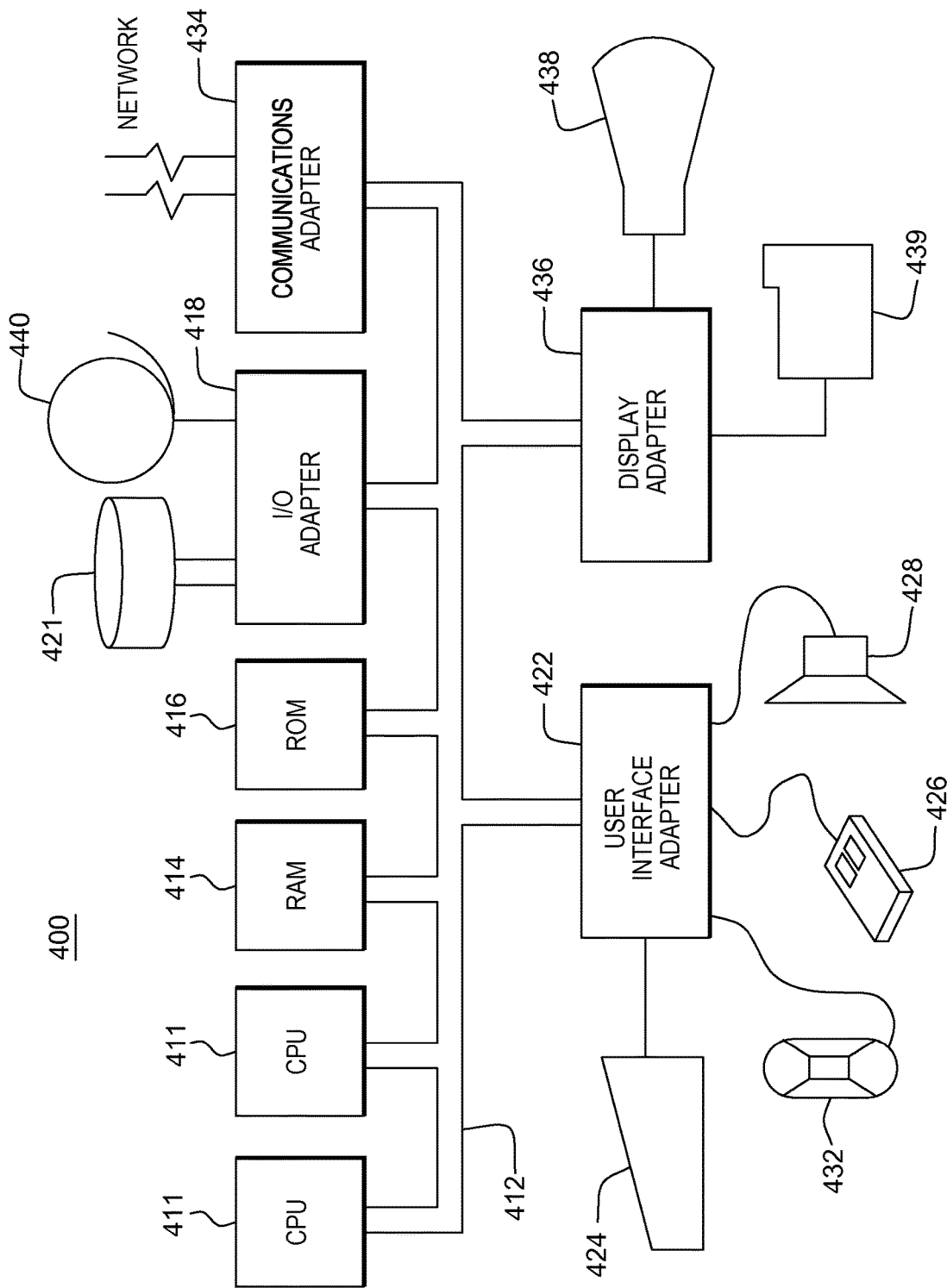
FIG. 7 depicts an exemplary hardware configuration for performing methods as described herein.

FIG. 7 illustrates one embodiment of an exemplary hardware configuration of a computing system 400 programmed to perform the method steps for generating offers of promotions for targeted groups as described herein with respect to FIGS. 1-6. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating targeted promotions comprising:
   receiving, at a processing unit, historical promotion data offered to plurality of customers,
   receiving, at the processing unit, a set of customer features associated with prior transactions associated with previous promotion offerings and acceptances as recorded in a memory storage device;
   generating, at the processing unit, a full predictive model using the set of customer features and the historical promotion data, wherein the full predictive model is executable by the processing unit to predict acceptance of promotions from customers when all customer features of the set of customer features are considered;
   determining, at the processing unit, an importance score for each of the customer features, wherein determining the importance score for each customer feature comprises:
   generating, at the processing unit, a reduced predictive model for the customer feature using the historical promotion data and a subset of the customer features that excludes the customer feature, wherein the reduced predictive model is executable by the processing unit to predict acceptance of promotions from customers when the customer feature is excluded from the subset of customer features;
   computing, for a given customer feature, a probability that at least one customer with the given customer feature will accept a given promotion is maximized under the full predictive model, but is not maximized under the reduced predictive model;
   determining, at the processing unit, the importance score for the customer feature based on the probability, the full predictive model and the reduced predictive model, wherein the importance score indicates an effect of the customer feature on the full predictive model;
   iteratively performing, by the processing unit, the generating of the reduced predictive model and the determining of importance scores, for each customer feature among the set of customer features until an importance score is determined for all customer features;
   selecting, by the processing unit, a number of customer features based on the determined importance scores;
   constructing, using transaction data relating to the prior transactions, the set of customer features, and the importance scores, an objective function that maximizes a given threshold;
   for the given promotion, determining, at the processing unit, a target group of customers for the given promotion by solving an optimization problem based on the selected customer features, wherein:
   the given promotion is among a plurality of promotions;
   each promotion among the plurality of promotions corresponds to a respective expected acceptance rate;
   the optimization problem is being solved based on the objective function to maximize a difference between the target group's expected acceptance rate for the given promotion and the target group's highest expected acceptance rate for any promotion among the plurality of promotions excluding the given promotion, under a constraint that a probability of a percentage of customers among the target group will receive the given promotion meets the given threshold being maximized by the objective function;

receiving, by the processing unit, a query from a customer among the target group of customers, wherein the query relates to the given promotion; and sending, by the processing unit automatically, the given promotion to the target group of customers.

2. The method of claim 1, wherein determining the importance scores comprises:

computing, at the processing unit, an importance score of a given customer feature for the given promotion indicating a probability that a customer with the given customer feature will accept the given promotion is maximized, while recommending a different promotion when the given customer feature is ignored.

3. The method of claim 1, wherein the importance score of each customer feature n where $n \in \{1.2 \ldots N\}$ for a promotion $s^* \in S$, where S is a set of promotion options, is computed by the processing unit according to:

$$\int 1[s^* = \arg\max_s p(x,s)] 1[s^* \neq \arg\max_s p^{-n}(x,s)] f(x) dx$$

wherein p(x,s) representing a probability that a customer with feature x will accept promotion s in which a full model having all customer features for promotion "s" is implemented and $p^{-n}(x,s)$ is the same probability as p(x,s) estimated without feature n; and wherein $f(x)$ is function representing an empirical probability distribution of customer features according to:

$f(x)$=(number of transaction records whose customer feature is x)/T, where T is the number of customer transactions.

4. The method of claim 3, further comprising:

based on the computed importance scores of customer features, selecting by the processing unit the M most important features for promotion s;

for given feature vector x, constructing an M-dimensional vector of important features as $x_A$, and constructing, by the processing unit, an (N−M) dimensional vector of remaining features as $x_B$; and constructing, by the processing unit, a function $g(x_A)$ representing a marginal distribution of the M most important features by integrating over the remaining features $x_B$ based on the function $f(x)$.

5. The method of claim 4, further comprising:

constructing, by the processing unit, the objective function according to:

$$\max_{lb,ub} \int_x (p(x,s^*) - \max_{s \neq s^*} p(x,s)) 1[lb \leq x_A \leq ub] f(x) dx$$

such that a constraint $$\int_{lb \leq x_A \leq ub} g(x_A) dx_A = z(s)$$

is satisfied, where z(s) represents the percentage of customers who will receive promotion s, and lb and ub indicate the lower and upper bounds on the important features.

6. The method of claim 1, further comprising:

automatically selecting, by the processing unit, a promotion from the plurality of promotions; and automatically initiating, by the processing unit, a promotion offering of the selected promotion to each of said customers of the targeted group of customers, wherein a percentage of future transactions to which the promotion is offered is expected to exceed a threshold level.

7. A computer program product, comprising: a non-transitory computer readable storage medium having computer readable program code stored thereon that, when executed, performs a method for generating targeted promotions comprising:

receiving, at a processing unit, historical promotion data offered to plurality of customers, receiving, at the processing unit, a set of customer features associated with prior transactions associated with previous promotion offerings and acceptances as recorded in a memory storage device;

generating, at the processing unit, a full predictive model using the set of customer features and the historical promotion data, wherein the full predictive model is executable by the processing unit to predict acceptance of promotions from customers when all customer features of the set of customer features are considered;

determining, at the processing unit, an importance score for each of the customer features, wherein determining the importance score for each customer feature comprises:

generating, at the processing unit, a reduced predictive model for the selected customer feature using the historical promotion data and a subset of the customer features that excludes the customer feature, wherein the reduced predictive model is executable by the processing unit to predict acceptance of promotions from customers when the customer feature is excluded from the subset of customer features;

computing, for a given customer feature, a probability that at least one customer with the given customer feature will accept a given promotion is maximized under the full predictive model, but is not maximized under the reduced predictive model;

determining, at the processing unit, the importance score for the selected customer feature based on the probability, the full predictive model, and the reduced predictive model, wherein the importance score indicates an effect of the customer feature on the full predictive model iteratively performing, by the processing unit, the generating of the reduced predictive model and the determining of importance scores, for each customer feature among the set of customer features until an importance score is determined for all customer features;

selecting, by the processing unit, a number of customer features based on the determined importance scores;

constructing, using transaction data relating to the prior transactions, the set of customer features, and the importance scores, an objective function that maximizes a given threshold;

for the given promotion, determining, at the processing unit, a target group of customers for the given promotion by solving an optimization problem based on the selected customer features, wherein:

the given promotion is among a plurality of promotions;

each promotion among the plurality of promotions corresponds to a respective expected acceptance rate;

the optimization problem is being solved based on the objective function to maximize a difference between the target group's expected acceptance rate for the given promotion and the target group's highest expected acceptance rate for any promotion excluding the given promotion, under a constraint that a probability of a percentage of customers among the target group will receive the given promotion meets the given threshold being maximized by the objective function;

receiving, by the processing unit, a query from a customer among the target group of customers, wherein the query relates to the given promotion; and sending, by the processing unit automatically, the given promotion to the target group of customers.

8. The computer program product of claim 7, wherein determining the importance scores comprises computing an importance score of a given customer feature for the given promotion indicating a probability that a customer with the given customer feature will accept the given promotion is maximized, while recommending a different promotion when the given customer feature is ignored, and wherein the importance score of each customer feature n where $n \in \{1.2 \ldots N\}$ for a promotion $s^* \in S$, where S is a set of promotion options, is being computed, by the processing unit, according to:

$$\int 1[s^* = \arg\max_s p(x,s)] 1[s^* \neq \arg\max_s p^{-n}(x,s)] f(x) dx$$

wherein p(x,s) representing a probability that a customer with feature x will accept promotion s in which a full model having all customer features for promotion "s" is provided and $p^{-n}(x,s)$ is the same probability as p(x,s) estimated without feature n; and wherein $f(x)$ is function representing an empirical probability distribution of customer features according to:

$f(x) = $ (number of transaction records whose customer feature is x)/T, where T is the number of customer transactions.

9. The computer program product of claim 8, further comprising:

based on the computed importance scores of customer features, selecting by the processing unit the M most important features for promotion s;

for given feature vector x, constructing an M-dimensional vector of important features as $x_A$, and constructing, by the processing unit, an (N−M) dimensional vector of remaining features as $x_B$; and constructing, by the processing unit, a function $g(x_A)$ representing a marginal distribution of important features by integrating over the remaining features $x_B$ based on the function $f(x)$.

10. The computer program product of claim 9, further comprising:

constructing, by the processing unit, the objective function according to:

$$\max_{lb,ub} \int_x (p(x, s^*) - \max_{s \neq s^*} p(x, s)) 1[lb \leq x_A \leq ub] f(x) dx$$

such that a constraint $$\int_{lb \leq x_A \leq ub} g(x_A) dx_A = z(s)$$

is satisfied, where z(s) represents the percentage of customers who will receive promotion s, and lb and ub indicate the lower and upper bounds on the important features.

11. The computer program product of claim 7, wherein the method further comprises:

automatically selecting a promotion from the plurality of promotions; and automatically initiating a promotion offering of the selected promotion to each of said customers of the targeted group of customers, wherein a percentage of future transactions to which the promotion is offered is expected to exceed a threshold level.

12. A system for generating targeted promotions comprising:

a memory storage unit;

a processor communicatively coupled with said memory storage unit, the processor being configured to:

receive historical promotion data offered to plurality of customers;

receive a set of customer features associated with prior transactions associated with previous promotion offerings and acceptances as recorded in a memory storage device;

generate a full predictive model using the set of customer features and the historical promotion data, wherein the full predictive model is executable by the processing unit to predict acceptance of promotions from customers when all customer features of the set of customer features are considered;

determine an importance score for each of the customer features, wherein the determination of the importance score for each customer feature comprises:

generate a reduced predictive model for the selected customer feature using the historical promotion data and a subset of the customer features that excludes the customer feature, wherein the reduced predictive model is executable by the processing unit to predict acceptance of promotions from customers when the customer feature is excluded from the subset of customer features;

compute, for a given customer feature, a probability that at least one customer with the given customer feature will accept a given promotion is maximized under the full predictive model, but is not maximized under the reduced predictive model;

determine the importance score for the selected customer feature based on the probability, the full predictive model and the reduced predictive model for the selected customer feature, wherein the importance score indicates an effect of the customer feature on the full predictive model;

iteratively perform the generation of the reduced predictive model and the determining of importance scores, for each customer feature among the set of customer features until an importance score is determined for all customer features;

select a number of customer features based on the determined importance scores;

construct, using transaction data relating to the prior transactions, the set of customer features, and the importance scores, an objective function that maximizes a given threshold;

for the given promotion, determine a target group of customers for the given promotion by solving an optimization problem based on the selected customer features, wherein:

the given promotion is among a plurality of promotions;

each promotion among the plurality of promotions corresponds to a respective expected acceptance rate;

the optimization problem is being solved based on the objective function to maximize a difference between the target group's expected acceptance rate for the given promotion and the target group's highest expected acceptance rate for any promotion excluding the given promotion, under a constraint that a probability of a percentage of customers among the target group will receive the given promotion meets the threshold being maximized by the objective function;

receive a query from a customer among the target group of customers, wherein the query relates to the given promotion; and send, automatically, the given promotion to the target group of customers.

13. The system of claim 12, wherein to determine the importance score of each customer feature n where $n \in \{1.2 \ldots N\}$ for a promotion $s^* \in S$, where S is a set of promotion options, the processing unit is configured to compute:

$$\int 1[s^* = \arg\max_s p(x,s)] 1[s^* \neq \arg\max_s p^{-n}(x,s)] f(x) dx$$

wherein p(x,s) represents a probability that a customer with customer feature x will accept promotion s in which the first predictive model having all customer features for promotion "s" is provided and $p^{-n}(x,s)$ is the same probability as p(x,s) estimated without feature n; and wherein $f(x)$ is function representing an empirical probability distribution of customer features according to:

$f(x)$=(number of transaction records whose customer feature is x)/T, where T is the number of customer transactions.

14. The system of claim 13, wherein based on the computed importance scores of customer features, said processing unit is further configured to:

select the M most important customer features for promotion s; and for a given feature vector x:

construct an M-dimensional vector of important features as $x_A$;

construct an (N−M) dimensional vector of remaining features as $x_B$; and construct a function $g(x_A)$ representing the marginal distribution of important features by integrating over the remaining features $x_B$ based on the function $f(x)$, wherein to determine the target group, said processing unit is further configured to:

construct, using transaction data relating to the prior transactions, the set of customer features, and the importance scores, an objective function that maximizes the threshold, said objective function constructed according to:

$$\max_{lb,ub} \int_x (p(x, s^*) - \max_{s \neq s^*} p(x, s)) 1[lb \leq x_A \leq ub] f(x) dx$$

such that a constraint $$\int_{lb \leq x_A \leq ub} g(x_A) dx_A = z(s)$$

is satisfied, wherein z(s) represents the percentage of customers who will receive promotion s, and lb and ub indicate the lower and upper bounds on the important features.

15. The system of claim 12, wherein said processing unit is further configured to:

automatically select a promotion from the plurality of promotions; and automatically initiate a promotion offering of the selected promotion to each of said customers of the targeted group of customers, wherein a percentage of future transactions to which the promotion is offered is expected to exceed a threshold level.

* * * * *